US009916702B2

(12) United States Patent
Rudenko et al.

(10) Patent No.: US 9,916,702 B2
(45) Date of Patent: Mar. 13, 2018

(54) SYSTEMS AND METHODS FOR MONITORING OPERATIVE SUB-SYSTEMS OF A VEHICLE

(71) Applicant: THE BOEING COMPANY, Chicago, IL (US)

(72) Inventors: Alexey Rudenko, Culver City, CA (US); Tsai-Ching Lu, Wynnewood, PA (US); Craig A. Lee, Redondo Beach, CA (US); Franz David Betz, Renton, WA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 14/510,277

(22) Filed: Oct. 9, 2014

(65) Prior Publication Data

US 2016/0104330 A1 Apr. 14, 2016

(51) Int. Cl.
*G06Q 10/06* (2012.01)
*G07C 5/08* (2006.01)

(52) U.S. Cl.
CPC .................................. *G07C 5/0808* (2013.01)

(58) Field of Classification Search
CPC .......... G06Q 10/06; B60R 2021/01327; G07C 5/008; G07C 5/085
USPC ... 701/29.1, 31.4, 30.6, 29.7, 31.7, 33.7, 71; 702/183
See application file for complete search history.

(56) References Cited

U.S. PATENT DOCUMENTS

| | | | | |
|---|---|---|---|---|
| 7,873,449 B2 * | 1/2011 | Bujak | .................. | B60W 30/12 340/442 |
| 8,180,519 B2 * | 5/2012 | Brillhart | ................ | G06Q 10/06 700/30 |
| 2009/0138141 A1 * | 5/2009 | Nwadiogbu | ........... | G07C 5/085 701/3 |
| 2010/0057290 A1 * | 3/2010 | Brillhart | ................ | G06Q 10/06 701/31.4 |

FOREIGN PATENT DOCUMENTS

| | | |
|---|---|---|
| WO | 2013067461 | 5/2013 |

OTHER PUBLICATIONS

Babu, Shivmath, "Towards Automatice Optimization of MapReduce Programs,", 2011.
Dean, Jeffrey, "MapReduce: Simplified Data Processing on Large Clusters," 2004.
Elsayed, Tamer, "Pairwise Document Similarity in Large Collections with MapReduce," Jun. 2008Proceedings of ACL-08: HLT, Sort Papers, pp. 265-268.

(Continued)

*Primary Examiner* — Gertrude Arthur Jeanglaude
(74) *Attorney, Agent, or Firm* — Joseph M. Butscher; The Small Patent Law Group, LLC

(57) ABSTRACT

A vehicle may include at least one operative sub-system that includes at least one sensor configured to output one or more sensor signals related to the at least one operative sub-system. A monitoring system is in communication with the operative sub-system(s). The monitoring system is configured to correlate the one or more sensor signals with respect to time, compile initial statistics of the one or more sensor signals with respect to a plurality of variables; and correlate the plurality of variables.

20 Claims, 5 Drawing Sheets

(56) References Cited

OTHER PUBLICATIONS

Reshef, David, "Detecting Novel Associations in Large Data Sets," Dec. 2011, vol. 334, Science Magazine, pp. 1518-1524.
Byington, Carl S., "Dynamic Signal Analysis and Neural Network Modeling for Prediction of Flight Control Actuators," American Helicopter Society 60th Annual Forum, Jun. 2004.
Byington, Carl S., "In-Line Health Monitoring System for Hydraulic Pumps and Motors," 2003 IEEE.
Dakos, Vasilis, "Spatial correlation as leading indicator of catastrophic shifts," Theor Ecol, 2010 vol. 3 pp. 163-174.
Ghidella, Jason, "Requirements-Based Testing in Aircraft Control Design,", American Institute of Aeronautics and Astronautics, 2005.
Smith, Paul, "Analysis of Spread Spectrum Time Domain Reflectometry for Wire Fault Location," IEEE: Sensors Journal, vol. 5, No. 6, Dec. 2005.
Volponi, Allan J., Development of an Information Fusion System for Engine Diagnostics and Health Management, NASA/TM-2004-212924, 2004.
Scheffer, Marten, "Early-warning signals for critical transitions," Nature, vol. 461, Sep. 2009.
Furse, Cynthia, "Noise-Domain Reflectometry for Locating Wiring Faults," IEEE Transactions on Electromagnetic Compatibility, Feb. 2005.
Kobayashi, Takahisa, Application of a Bank of Kalman Filters for Aircraft Engine Fault Diagnostics, NASA/TM, 2003.
Simon, D., "Aircraft Turbofan Engine Health Estimation Using Contrained Kalman Filtering," NASA/TM, 2003.
Compton, Ryan, "Catastrophe Prediction via Estimated Network Autocorrelation", 2011.
Kobayashi, T., Hybrid Kalman Filter Approach for Aircraft Engine Fault Diagnostics,: Turbo Expo, Jun. 2003.

* cited by examiner

500

502 504

| VARIABLE | 0 | 0.1 | 0.2 | 0.25 |
|---|---|---|---|---|
| A | xx | xx | 4x | 5x |
| B | N/A | N/A | 2Y | 3Y |
| • | | | | |
| • | | | | |
| • | | | | |

506

600

606 608 602 604

| VARIABLE | VALUE | RANGE MIN | RANGE MAX |
|---|---|---|---|
| A | -2000 | 0 | 4000 |
| A | 4002 | 0 | 4000 |
| B | 0.001 | 50 | 500 |
| • | | | |
| • | | | |
| • | | | |

700
| 702 | 704 | 706 | 708 | 710 | 712 | 714 | 716 | 718 |
|---|---|---|---|---|---|---|---|---|
| VEHICLE | VARIABLE | MIN | MAX | MEAN | MEDIAN | RANGE | MODE | SIZE |
| A1234Z | A | 0 | 1 | 0.984 | 1 | 1 | 1 | 125 |
| A1234Z | B | 2759 | 2759 | 2759 | 2759 | 0 | 2759 | 84 |
| A1234Z | C | 0 | 33 | 27 | 32 | 33 | 32 | 12 |
| • • • | • • • | | | | | | | |
FIG. 7
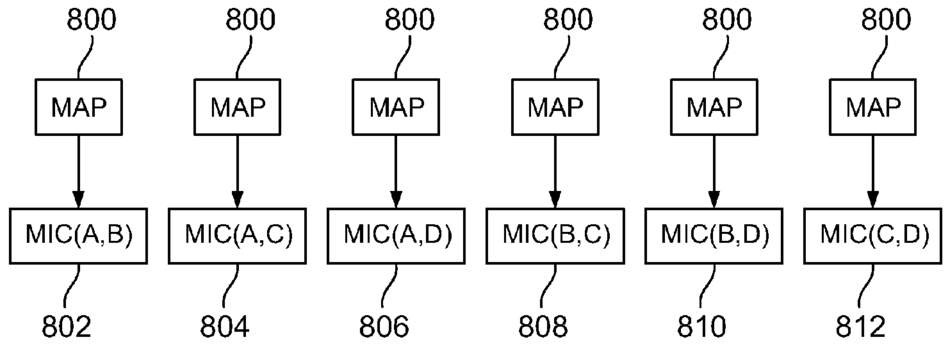
FIG. 8
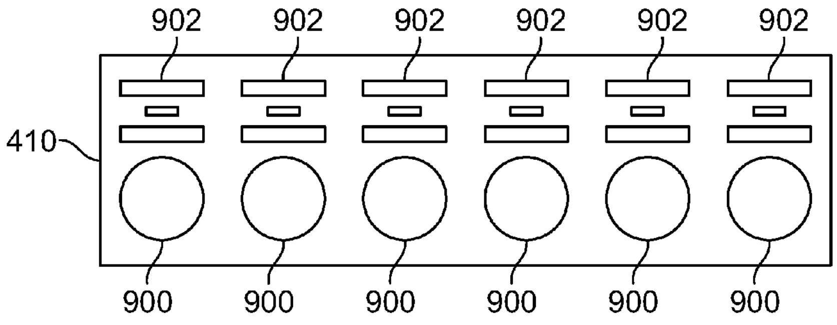
FIG. 9

SYSTEMS AND METHODS FOR MONITORING OPERATIVE SUB-SYSTEMS OF A VEHICLE

BACKGROUND OF THE DISCLOSURE

Embodiments of the present disclosure generally relate to systems and methods for monitoring one or more operative sub-systems of a vehicle.

Various vehicles include numerous electronics, hardware, and other sub-systems that are used during operation of the vehicles. For example, a typical aircraft includes numerous sub-systems (such as flight control systems, radar systems, air conditioning units, air intakes, blowers, electronics, and the like) positioned throughout the aircraft. At least some of the sub-systems may be vital to the performance or intended mission of the aircraft. For example, an airplane may include radar electronics in a forward portion of the fuselage and hydraulic and pneumatic systems throughout the fuselage. Various military aircraft include a broad suite of systems and electronics, many of which are mission and/or flight critical systems.

Operative sub-systems of a vehicle may be monitored over time to determine whether or not they are functioning properly. Each operative sub-system may be monitored in order to determine impending faults. For example, internal diagnostic checking routines, such as built-in self-test routines, are executed by computers to detect fault conditions. An individual then inspects fault archives and performs diagnostic testing to determine the root causes of a particular fault. As can be appreciated, a typical aircraft includes numerous operative sub-systems. As such, the process of analyzing data from each operative sub-system may be time-consuming and labor-intensive.

Accordingly, a need exists for an efficient method of analyzing data from operative sub-systems to determine the existence of impending faults.

SUMMARY OF THE DISCLOSURE

Certain embodiments of the present disclosure provide a vehicle that may include at least one operative sub-system. The operative sub-system(s) includes at least one sensor configured to output one or more sensor signals related to the operative sub-system(s). A monitoring system may be in communication with the operative sub-system(s). system(s). The monitoring system is configured to correlate the sensor signal(s) with respect to time, compile initial statistics of the sensor signal(s) with respect to a plurality of variables; and correlate the plurality of variables with one another.

In at least one embodiment, the monitoring system may include a data correlation unit that is configured to correlate the sensor signal(s) with respect to time, an initial statistics compilation unit that is configured to compile the initial statistics, and a variable correlation unit that is configured to correlate the plurality of variables. The monitoring system may also include a data filtering unit that is configured to filter one or both of irrelevant or out-of-range data from the sensor signals.

In at least one embodiment, the data correlation unit is configured to output a data table that correlates the sensor signal(s) with respect to time. For example, the data correlation unit may correlate the occurrence of each sensor signal with a particular time of the occurrence.

In at least one embodiment, the initial statistics compilation unit is configured to output an initial statistics report that compiles the initial statistics of the sensor signal(s) with respect to the plurality of variables. The initial statistics report may include at least the following statistics of the sensor signals with respect to the plurality of variables: a minimum value, a maximum value, a mean value, and a median value.

In at least one embodiment, the variable correlation unit is configured to calculate maximal information coefficients (MICs) with respect to the plurality of variables. The variable correlation unit may be configured to output tasks and compute MIC calculations for each of the tasks. The variable correlation unit may be configured to generate separate and distinct tasks, wherein each of the task includes a two variable time series. The variable correlation unit may be configured to compute the MIC calculations using only one or more mappers without reducers. In at least one embodiment, the variable correlation unit may include a plurality of nodes. The variable correlation unit may be configured to fairly distribute the tasks among the plurality of nodes.

Certain embodiments of the present disclosure provide a method of monitoring one or more operative sub-systems of a vehicle. The method may include receiving one or more sensor signals from the operative sub-system(s) of the vehicle, correlating the sensor signal(s) with respect to time, outputting a data table that correlates the sensor signal(s) with respect to time, filtering one or both of irrelevant or out-of-range data from the sensor signal(s), compiling initial statistics of the sensor signal(s) with respect to a plurality of variables, outputting an initial statistics report that compiles the initial statistics of the sensor signal(s) with respect to the plurality of variables, and correlating the plurality of variables.

Certain embodiments of the present disclosure provide a monitoring system in communication with at least one operative sub-system. The monitoring system may include a communication link that is configured to receive one or more sensor signals from the operative sub-system(s), a data correlation unit that is configured to correlate the sensor signal(s) with respect to time, an initial statistics compilation unit that is configured to compile initial statistics of the sensor signal(s) with respect to a plurality of variables, and a variable correlation unit that is configured to correlate the plurality of variables. In at least one embodiment, the monitoring system is onboard a vehicle.

BRIEF DESCRIPTION OF THE DRAWINGS

FIG. 7 illustrates a simplified diagram of an initial statistics report output by an initial statistics compilation unit, according to an embodiment of the present disclosure.

FIG. 8 illustrates a simplified diagram of a maximal information coefficient calculation, according to an embodiment of the present disclosure.

FIG. 9 illustrates a schematic diagram of a variable correlation unit distributing tasks among nodes, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for preprocessing and/or processing data, such as massive amounts of aircraft sensor data, in order to monitor various operative sub-systems, such as those of an aircraft. The systems and methods are configured to efficiently compile and output data that may be analyzed to determine impending failures, errors, or other such faults within the operative sub-systems. In at least one embodiment, a monitoring system receives raw data collected and output by sensors of operative sub-systems, and outputs initial statistics related to potential faults of the operative sub-systems. The systems and methods are configured to quickly and efficiently output the initial statistics.

Embodiments of the present disclosure provide fast and reliable data processing of aircraft sensor data that may be analyzed for fault predictions. Embodiments of the present disclosure provide systems and methods that prepare data for statistical analysis through formatting and cleaning of the received data. Further, the systems and methods may calculate statistics, such as through parallel processing. The statistics may be initial statistics that may be further analyzed to predict faults.

Figure 1:
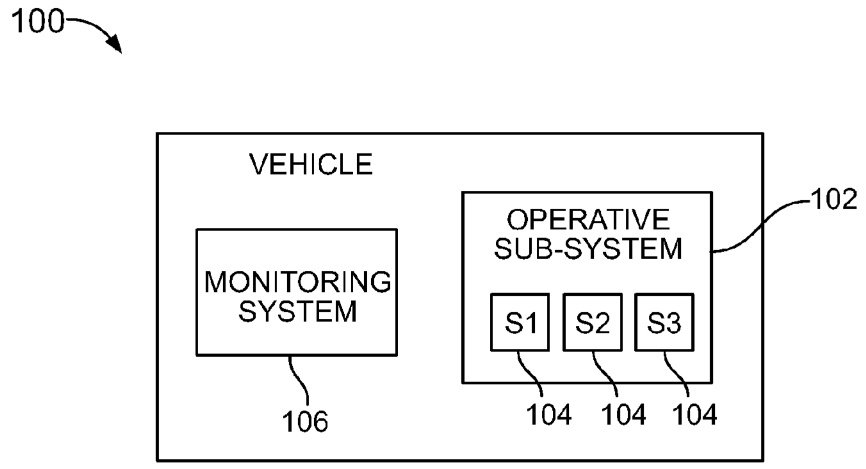
FIG. 1 illustrates a block diagram of a vehicle, according to an embodiment of the present disclosure.

FIG. 1 illustrates a block diagram of a vehicle 100, according to an embodiment of the present disclosure. The vehicle 100 may be an aircraft, such as a commercial or military jet, for example. Alternatively, the vehicle 100 may be a land-based vehicle, a boat or water-based vehicle, an aerospace vehicle, and/or the like.

The vehicle 100 may include at least one operative sub-system 102 located throughout, on, or within the vehicle 100. While the vehicle 100 is shown having one operative sub-system 102, the vehicle 100 may include more operative sub-systems 102 than shown. Each operative sub-system 102 may be an electronics, mechanical, or hardware sub-system. For example, if the vehicle 100 is an aircraft, the operative sub-system 102 may include a radar system, hydraulic system, pneumatic system, a flight control system, a navigation system, one or more communication systems, life support equipment, an ordnance delivery system (such as missile guidance systems), an air-conditioning system, a blower, an air intake system, and the like. If the vehicle 100 is an automobile, for example, the operative sub-system 102 may include a fuel-monitoring system, a tire pressure monitoring system, an oil monitoring system, an air conditioning system, an engine control system, and/or the like. In short, the operative sub-system 102 may include any system, hardware, equipment, or the like that is to be monitored to determine whether the operative sub-system 102 is properly functioning.

The operative sub-system 102 may include a plurality of sensors 104 that are configured to sense one or more variables of the operative sub-system 102. The variables may include any attribute, feature, or the like that may change over time, such as voltage, current, fluid pressure (e.g., air pressure), temperature, and the like. As shown, the operative sub-system 102 may include three sensors 104. Alternatively, the operative sub-system 102 may include more or less than three sensors 104. Each sensor 104 may be configured to determine the same or different variables of the operative sub-system 102.

A monitoring system 106 is in communication with the sensors 104 of the operative sub-system 102. For example, the sensors 104 may be in communication with the monitoring system 106 through wired and/or wireless connections. The monitoring system 106 may be in communication with each sensor 104 through a respective communication channel, for example.

The monitoring system 106 is configured to receive data signals, such as raw data, from the sensors 104. After receiving the data signals from the sensors 104, the monitoring system 106 may prepare the data for statistical analysis. For example, the monitoring system 106 may organize and format the data, and filter and clean the data to remove irrelevant and/or faulty data. The monitoring system 106 may also calculate statistics based on the received data. The statistics may be analyzed for fault detection. As such, the monitoring system 106 may pre-process the data received from the sensors 104 of the operative sub-system 102. The pre-processed data, such as in the form of a statistical overview, may then be analyzed by a fault-detection system to determine the existence of impending faults within the operative sub-system 102.

While shown within the vehicle 100, the monitoring system 106 may be remotely located from the vehicle 100. For example, the monitoring system 106 may be or include a cluster of computers at a central monitoring site.

The monitoring system 106 may be or include one or more computers, control units, circuits, or the like, such as processing devices, that may include one or more microprocessors, microcontrollers, integrated circuits, and the like. For example, the monitoring system 106 may include a cluster of interconnected or intercommunicating computers. The monitoring system 106 may also include memory, such as non-volatile memory, random access memory, and/or the like. The memory may include any suitable computer-readable media used for data storage. The computer-readable media are configured to store information that may be interpreted by the monitoring system 106. The information may be data or may take the form of computer-executable instructions, such as software applications, that cause a microprocessor or other such control unit within the monitoring system 106 to perform certain functions and/or computer-implemented methods. The computer-readable media may include computer storage media and communication media. The computer storage media may include volatile and non-volatile media, removable and non-removable media implemented in any method or technology for storage of information such as computer-readable instructions, data structures, program modules or other data. The memory and/or computer storage media may include, but are not limited to, RAM, ROM, EPROM, EEPROM, or other solid state memory technology, CD-ROM, DVD, or other optical storage, magnetic cassettes, magnetic tape, magnetic disk storage or other magnetic storage devices, or any other medium which may be used to store desired information and that may be accessed by components of the monitoring system 106.

Figure 2:
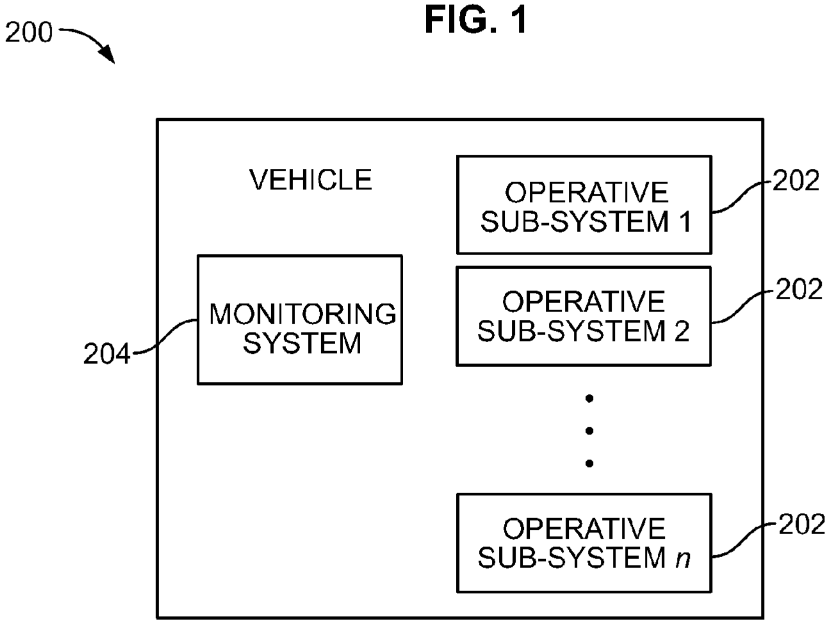
FIG. 2 illustrates a block diagram of a vehicle, according to an embodiment of the present disclosure.

FIG. 2 illustrates a block diagram of a vehicle 200, according to an embodiment of the present disclosure. The vehicle 200 includes a plurality of operative sub-systems 202, each of which may include one or more sensors, as described above. A monitoring system 204 is in communication with each of the sensors of each of the operative sub-systems 202. Thus, the monitoring system 204 may be configured to monitor multiple operative sub-systems 202. For example, the operative sub-system 1 may be an air intake sub-system, while the operative sub-system 2 may be an air conditioning sub-system connected to the air intake sub-system. The monitoring system 204 may be configured to be in communication with and monitor each and every operative sub-system 202 within the vehicle 200. While shown within the vehicle 200, the monitoring system 204 may be remotely located from the vehicle 200. For example, the monitoring system 204 may be or include a cluster of computers at a central monitoring site.

Figure 3:
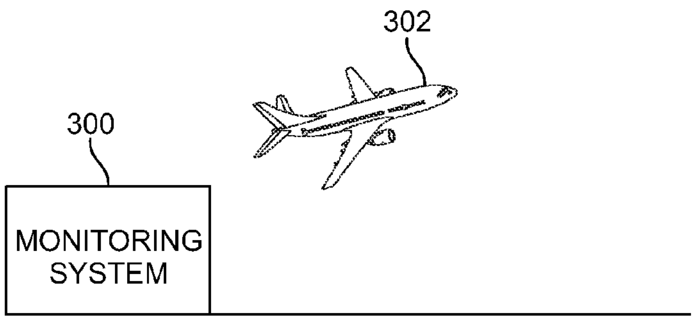
FIG. 3 illustrates a simplified diagram of a monitoring system that monitors a vehicle, according to an embodiment of the present disclosure.

FIG. 3 illustrates a simplified diagram of a monitoring system 300 that monitors a vehicle 302, according to an embodiment of the present disclosure. As shown, the vehicle 302 may be an aircraft, such as a commercial airliner. The monitoring system 300 may be remotely located from the vehicle 302. For example, the monitoring system 300 may be at a fixed land-based location. The monitoring system 300 may be or include one or more computers, processors, or the like.

Figures 4, 5, 6:
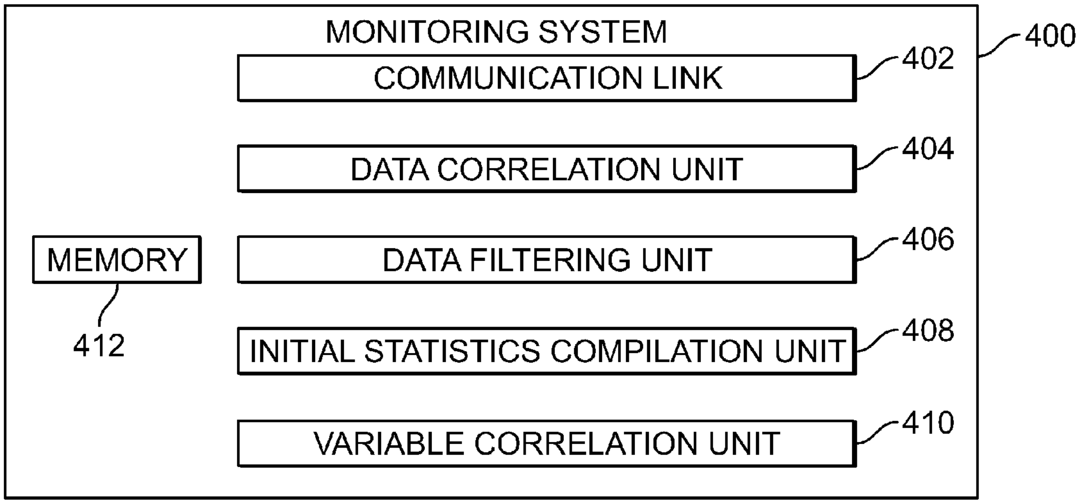
FIG. 4 illustrates a block diagram of a monitoring system, according to an embodiment of the present disclosure.
FIG. 5 illustrates a simplified diagram of a unified data table generated by a data correlation unit, according to an embodiment of the present disclosure.
FIG. 6 illustrates a simplified diagram of a discarded data table generated by a data filtering unit 406, according to an embodiment of the present disclosure.

FIG. 4 illustrates a block diagram of a monitoring system 400, according to an embodiment of the present disclosure. The monitoring system 400 is an example of the monitoring systems 106, 204, and 300, shown in FIGS. 1-3, respectively. The monitoring system 400 may include a communication link 402 (such as a transceiver, input/output port, wired connection, and/or the like), a data correlation unit 404, a data filtering unit 406, an initial statistics compilation unit 408, a variable correlation unit 410, and a memory 412. The data correlation unit 404, the data filtering unit 406, the initial statistics compilation unit 408, the variable correlation unit 410, and the memory 412 may be separate and distinct components. Alternatively, each may be part of a single computer, processing unit, or the like. For example, the data correlation unit 404, the data filtering unit 406, the initial statistics compilation unit 408, the variable correlation unit 410, and the memory 412 may be separate and distinct electronic modules within a computer, processor, microcontroller, integrated chip, and/or the like.

The monitoring system 400 may be or include one or more processors, memories, and the like. For example, the monitoring system 400 may be or include a computer onboard a vehicle. Optionally, the monitoring system 400 may be remotely located from the vehicle. In at least one embodiment, the monitoring system 400 may be contained within a single assembly, such as a single computer. In at least one other embodiment, one or more components of the monitoring system 400 may be distributed among multiple computers, processing units, and/or the like at separate and distinct locations. For example, the variable correlation unit 410 may include a plurality of computing devices at separate and distinct locations.

The communication link 402 may be a wired or wireless input/output port that is in communication with sensors of one or more operative sub-systems, such as those described above with respect to FIGS. 1 and 2. The communication link 402 is configured to receive sensor signals from the sensors of the operative sub-system(s).

The communication link 402 receives raw data in the form of the sensors signals from one or more sensors of one or more operative sub-systems. The data correlation unit 404 receives the sensor signals from the communication link 402 and correlates the received data with respect to time, for example. In at least one embodiment, the data correlation unit 404 compiles the data from the sensors signals into a data table that correlates the sensor signals with time. For example, the data correlation unit 404 matches each sensor signal with its time of occurrence.

The data filtering unit 406 filters the data, whether raw data, or the data that is correlated with time by the data correlation unit 404, according to one or more variables of interest. For example, the memory 412 may store various variables that are to be analyzed. The variables may relate to various aspects of one or more operative sub-systems. As an example, stored variables of interest may relate to environmental control system air pressure, temperature, and/or the like. As another example, stored variables of interest may relate to aircraft guidance system voltage, current, and/or the like. The data filtering unit 406 retains data that corresponds to the variables of interest, and ignores or discards data that does not correspond to the variables of interest.

The data filtering unit 406 may also filter the data, whether raw data, or the data that is correlated with time by the data correlation unit 404, to remove erroneous data. For example, the memory 412 may store data ranges for each variable of interest. If received data is outside of the data range, the data filtering unit 406 may flag the received data as erroneous and disregard and/or discard the flagged data.

After the data filtering unit 406 filters the data, the initial statistics compilation unit 408 may compile initial statistics based on the data. For example, the initial statistics compilation unit 408 may access the memory 412 with respect to various statistical measures for the data received from the sensors of the operative sub-system(s). The initial statistics may include a minimum value, a maximum value, a mean value, a median value, a range, a mode, and the like. The initial statistics compilation unit 408 may analyze the data over a particular time frame to determine and store the various statistical values.

The variable correlation unit 410 calculates basic variable correlations or statistics based on the received data. The variable correlations may be analyzed by a fault detection system to determine impending faults of one or more operative sub-systems. Accordingly, the monitoring system 400 may be configured to preprocess raw data in the form of sensor signals from sensors of one or more operative sub-systems. The preprocessed data may be in the form of a variable correlations and/or initial statistics in form of a data structure, report, or the like. The preprocessed data may be analyzed by a processing unit or computer of a fault detection system to determine impending faults of the operative sub-system(s).

FIG. 5 illustrates a simplified diagram of a unified data table 500 generated by the data correlation unit 404 (shown in FIG. 4), according to an embodiment of the present disclosure. In general, data analysis may be focused on a particular functional component or sub-system of a vehicle, such as an aircraft. A list of relevant variables to analyze may be selected by an individual. For example, an entire avionic system of an aircraft may include over 1000 variables. An individual may decide to select all or a subset of those variables to analyze. As another example, an environmental control system may include 100 variables, all of which may be selected for analysis. Accordingly, an individual may select variables of interest for various operative sub-systems. The variables of interest may be stored in the memory 412.

Referring to FIGS. 4 and 5, as raw data in the form of sensor signals is received by the monitoring system 400, the data correlation unit 404 correlates the received sensors signals with respect to time. As shown in FIG. 5, the data table 500 may include a variable axis 502 and a time axis 504. The variable axis 502 may be a vertical axis that corresponds to various variables of received data. For example, each variable may be related to a particular aspect of an operative sub-system, such as fan speed, internal cabin air pressure, radar output voltage or current, or the like. The time axis 504 may be with respect to seconds. The time increments of the time axis 504 may be greater or less than shown. The data table 500 may also include a received data field 506 that correlates received data for a particular variable at a particular time. For example, as shown in FIG. 5, the received data for variable A at time 0.2 seconds is 4X. The data table 500 may include more or less variables than shown. Further, the data table 500 may correlate received data over longer periods of time than shown. It is to be understood that the data table 500, as shown, is a simplified data table.

As shown, the data correlation unit 404 arranges the sensor signals (for example, data values) along the time axis 504. The data correlation unit 404 may output the data table 500 in real time, as sensor signals are received, and/or at a later time, after all the relevant data is received.

Optionally, the data correlation unit 404 may not compile received data into a data table. Instead, the data correlation unit 404 may correlate received sensors signals with respect to time and store the correlated data.

FIG. 6 illustrates a simplified diagram of a discarded data table 600 generated by a data filtering unit 406, according to an embodiment of the present disclosure. As shown, the discarded data table 600 includes range minimums 602 and range maximums 604 for each variable 606. Referring to FIGS. 4 and 6, the range minimums 602 and the range maximums 604 may be stored in the memory 412. As sensor signals are received, the sensor signals may be values 608 that are outside the bounds for a particular variable that are stored in the memory 412. For example, the range minimum 602 for a variable A may be 0, while the range maximum for the variable A may be 4000. Sensor signals that represent values 608 outside of the range minimum and maximum are discarded by the data filtering unit 406.

The data filtering unit 406 may filter out the out-of-range values before or after the data correlation unit 404 correlates the sensor signals with time. Further, while shown as the table 600, the data filtering unit 406 may not actually generate a table. Instead, the data filtering unit 406 may simply remove the out-of-range data values from further analysis.

The minimum and maximum values for a particular variable may be pre-defined and stored in the memory 412. For example, a manufacturer of a particular operative sub-system may define or otherwise designate particular output values of sensors of the operative sub-system as erroneous readings, such as caused by background noise. Optionally, a vehicle operator may define and set various range minimums and maximums for variables based on operational experience, testing, experimentation, and/or the like.

As can be appreciated, sensors of an operative sub-system occasionally output faulty data that does not reflect an actual condition experienced by the operative sub-system. The data filtering unit 406 filters out such out-of-range, faulty data. The data filtering unit 406 scans the received sensor signals and verifies that the sensors signals are within an acceptable range. Received sensors signals that are not within the acceptable range (for example, between a minimum and maximum value) are filtered and removed from further data analysis.

The data filtering unit 406 may also filter variables that are not of interest or are otherwise irrelevant. As noted above, variables of interest may be stored in the memory 412. If received sensor signals do not match any of the stored variables of interest, the data filtering unit 406 may filter the non-matching variable, such as by discarding or ignoring the non-matching variable.

FIG. 7 illustrates a simplified diagram of an initial statistics report 700 output by the initial statistics compilation unit 408 (shown in FIG. 4), according to an embodiment of the present disclosure. The initial statistics compilation unit 408 analyzes the sensors signals that have been filtered by the data filtering unit 406 and compiles initial statistics. As shown, the initial statistics report 700 may include a vehicle column 702, a variable column 704, a minimum value column 706, a maximum value column 708, a mean value column 710, a median value column 712, a range column 714, a mode column 716, and a size column 718. Additional statistics may also be included. Alternatively, the initial statistics report 700 may include less statistics than shown. The report 700 may be displayed on a monitor of a computer, for example. Optionally, the initial statistics compilation unit 408 may simply compile the various statistics for each variable and store the compiled statistics as a data structure within the memory 412.

After the sensor signals are filtered by the data filter unit 406, the initial statistics compilation unit 408 analyzes the sensor signals for statistical processing. For example, the initial statistics compilation unit 408 may analyze all the received sensors signals for each variable, and determine the minimum, maximum, mean, media, range, mode, and size for each variable during a relevant analyzed time frame. The initial statistics may provide information with respect to an abnormality, error, failure, or other such fault within an operative sub-system. For example, a voltage output by a sensor of an operative sub-system may be within an acceptable range, but may be concentrated too close to a minimum acceptable value. The concentration of the received sensor signals proximate to a terminal acceptable value (such as a minimum or maximum acceptable value) may be indicative of an impending fault of the operative sub-system. The initial statistics compilation unit 408 may flag such abnormal concentrations proximate to the minimum or maximum acceptable values. If the concentration is within a certain percentage, for example, the initial statistics compilation unit 408 may generate a flag or alert with respect to the particular variable.

For example, the initial statistics report 700 may relate to sensor signals of an auxiliary power unit (APU) of an aircraft. Voltage values of the APU may fluctuate as a stable current is established. As such, the voltage values during such time may concentrate near a terminal acceptable value.

However, after the stable current is established, the voltage values may move away from the terminal acceptable value towards safer values.

The initial statistics report 700 relates to sensor signals that relate to individual variables. The initial statistics report 700 may not be configured to detect correlation in behavior between two or more variables. Instead, the variable correlation unit 410 may be configured to correlate multiple variables with one another.

The variable correlation unit 410 correlates separate and distinct variables with one another. For example, the variable correlation unit 410 may be configured to calculate maximal information coefficients (MICs) with respect to the separate and distinct variables.

MIC represents a measure of the strength of a linear or non-linear association between two separate and distinct variables. MIC may use binning to apply mutual information on continuous random variables, such as the various variables related to various operative sub-systems of a vehicle. Binning applies mutual information to continuous distributions. MIC may select the number of bins and select a maximum over many possible grids.

MIC calculation yields a coefficient that is representative of the strength of the association between separate and distinct variables. Also, an aircraft operates through various phases, including parked at a gate, push-back from the gate, taxiing to a runway, take-off, ascent, cruising, descent, landing, taxiing to a gate, and the like. Each variable may be measured during different flight phases. The set of all variables are input with respect to the following:

$$(n-1)*n/2 \text{ pairs}$$

where n is the number of variables for each phase. Thus, if there are 10 variables that are analyzed, a total of 45 pairs results ((10−1)*(10/2) for the phase of interest. The time of calculation grows exponentially with the number of variables. Due to a sampling rate in aircraft data, different flight phases, and the like, a Hadoop distributed file system with a MapReduce framework may be utilized to achieve parallelization with respect to an overall MIC calculation.

Hadoop is an open-source software framework for storage and large-scale processing of data-sets on clusters of hardware. Hadoop includes a Hadoop Common module, which contains libraries and utilities needed by other Hadoop modules, a Hadoop Distributed File System (HDFS), which is a distributed file-system that stores data, providing high aggregate bandwidth across the cluster, Hadoop YARN, which is a resource-management platform responsible for managing computer resources in clusters and using them for scheduling of applications, and Hadoop MapReduce, a programming model for large scale data processing.

MapReduce is a framework for processing parallelizable problems across large datasets using a large number of computers (nodes), collectively referred to as a cluster (if all nodes are on the same local network and use similar hardware) or a grid (if the nodes are shared across geographically and administratively distributed systems, and use more heterogeneous hardware). Computational processing may occur on data stored either in a file system (unstructured) or in a database (structured). MapReduce can take advantage of locality of data, processing it on or near the storage assets in order to reduce the distance over which it is to be transmitted.

In the map step, the master node takes the input, divides it into smaller sub-problems, and distributes them to worker nodes. A worker node may do this again in turn, leading to a multi-level tree structure. The worker node processes the smaller problem, and passes the answer back to its master node. In the reduce step, the master node then collects the answers to all the sub-problems and combines them in some way to form the output.

MapReduce allows for distributed processing of the map and reduction operations. Provided that each mapping operation is independent of the others, all maps may be performed in parallel. Similarly, a set of reducers may perform the reduction phase, provided that all outputs of the map operation that share the same key are presented to the same reducer at the same time, or that the reduction function is associative.

However, straightforward application of the MapReduce framework leads to long times of executions, due to a significant burden on network bandwidth. Embodiments of the present disclosure reduce the execution times as described below.

Referring again to FIG. 4, the variable correlation unit 410 may divide a MIC calculation problem into two separate MapReduce portions. The first MapReduce portion may be MIC task generation, while the second MapReduce portion may be MIC calculation.

MIC task generation may represent a full map-reduce, but may not be intensive in terms of CPU power consumption. Because sorting and grouping of data generally does not take long, the burden on the network communication is relatively low. MIC calculation may be CPU intensive, but it does not generate a network bottleneck because the calculation occurs in mappers, and no reducers may be executed.

During MIC task generation, the variable correlation unit 410 generates separate tasks. The output value may be a two variable time series that is phase divided for each pair. Each line in the output may represent a complete MIC task to be calculated.

For example, during MIC task generation, each variable name, such as the variables A, B, and C shown in FIG. 7, may represent a key. In the generated MIC tasks, each output key includes an input key pair associated with the time series of both variables. For example, if there are four variables A, B, C, and D, the variable correlation unit 410 outputs six output keys of paired variables, namely A-B, A-C, A-D, B-C, B-D, and C-D. The variable correlation unit 410 may pair more or less variables than four. As such, the output keys provide a two-variable time series. In at least one embodiment, reducers combine time series variables in the six variables A-B, A-C, A-D, B-C, B-D, and C-D.

Next, the variable correlation unit 410 computes MIC calculations using only mappers. Thus, for each output key, a single mapping occurs that generates a corresponding MIC calculation. For example, for each output key A-B, A-C, A-D, B-C, B-D, and C-D, separate and distinct mappers operate on each output key to generate MIC (A,B), MIC(A, C), MIC(A,D), MIC(B,C), MIC(B,D), and MIC(C,D), respectively.

FIG. 8 illustrates a simplified diagram of a MIC calculation, according to an embodiment of the present disclosure. As shown, six separate and distinct mappers 800 are used to map the output keys line by line without communicating with each other. The mappers 800 generate the MIC (A,B) 802, MIC(A,C) 804, MIC(A,D) 806, MIC(B,C) 808, MIC (B,D) 810, and MIC(C,D) 812 without any reducers. The mappers 800 treat each line as a separate and distinct MIC task, thereby generating the outputs 802-812 without reducers.

Further, the number of mappers 800 may be equal to the number of available processing devices, such as central processing units, within the variable correlation unit 410.

The variable correlation unit 410 may be a single computer including a plurality of processing devices. Alternatively, the variable correlation unit 410 may include a plurality of computers at the same location or different locations. By setting the number of mappers 800 to the number of available processing devices within the variable correlation unit 410, parallelism (for example, efficient parallel processing) is increased, thereby reducing execution time.

FIG. 9 illustrates a schematic diagram of a variable correlation unit 410 distributing tasks 902 among nodes 900, according to an embodiment of the present disclosure. As shown, the variable correlation unit 410 may include multiple nodes 900, such as processing devices (for example, central processing units). As shown, the tasks 902 are distributed similarly and fairly among the nodes 900. That is, each node 900 may receive the same number of tasks 902 as the other nodes 900. By distributing the tasks 902 fairly among the nodes 900, the overall time allocated for execution of all the tasks is reduced. The nodes 900 execute the tasks and output MIC calculations.

Alternatively, the variable correlation unit 410 may correlate variables through methods other than MIC. For example, the variable correlation unit 410 may simply pair variables with each other and calculate variable correlations accordingly. Nevertheless, it has been found that the MIC task generation and the MIC calculation as described above reduces network resources, processing time, and energy.

Figure 10:
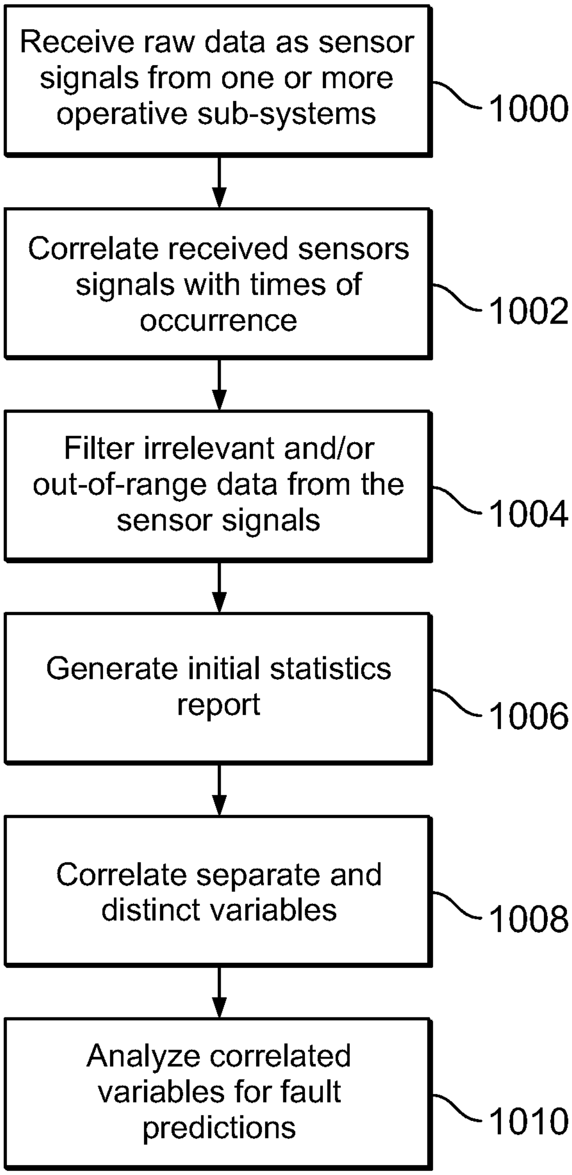
FIG. 10 illustrates a flow chart of a method of monitoring one or more operative sub-systems of a vehicle, according to an embodiment of the present disclosure.

FIG. 10 illustrates a flow chart of a method of monitoring one or more operative sub-systems of a vehicle, according to an embodiment of the present disclosure. At 1000, raw data in the form of sensor signals is received by a monitoring system, such as through a communication link, from one or more operative sub-systems of a vehicle. Next, at 1002, the received sensor signals are correlated with times of occurrence. For example, a data correlation unit may correlate the sensor signals with the times of occurrence. The data correlation unit may output an initial data correlation table that displays the received sensor signals correlated with times of occurrence.

At 1004, irrelevant and/or out-of-range data is filtered from the sensor signals. For example, a data filtering unit may filter the sensor signals. The filtering may occur before or after 1002.

Next, at 1006, an initial statistics report is generated that is based on the sensor signals. The initial statistics report may include various statistics for each variable within an overall system, such as one or more operative sub-systems. An initial statistics compilation unit may generate the initial statistics report.

After the initial statistics report is generated, separate and distinct variables of one or more operative sub-systems are correlated with each other at 1008. Alternatively, the correlation 1008 may occur before or concurrently with the generation of the initial statistics report. However, the variables may be correlated within one another with respect to initial statistics, in which case the initial statistics report or generation occurs beforehand. If the variable correlation is not with respect to statistics, but, instead, with respect to received and filtered sensor signals in general, the variable correlation, generation of an initial statistics report may be omitted.

After the separate and distinct variables of one or more operative sub-systems have been correlated, the correlated variables may be analyzed for fault predictions at 1010. For example, a separate and distinct fault detection system may analyze the variable correlations for fault analysis of the one or more operative sub-systems. As such, a monitoring system may preprocess sensor signals, and the fault detection system may process the preprocessed data to detect faults within one or more operative sub-systems.

Figure 11:
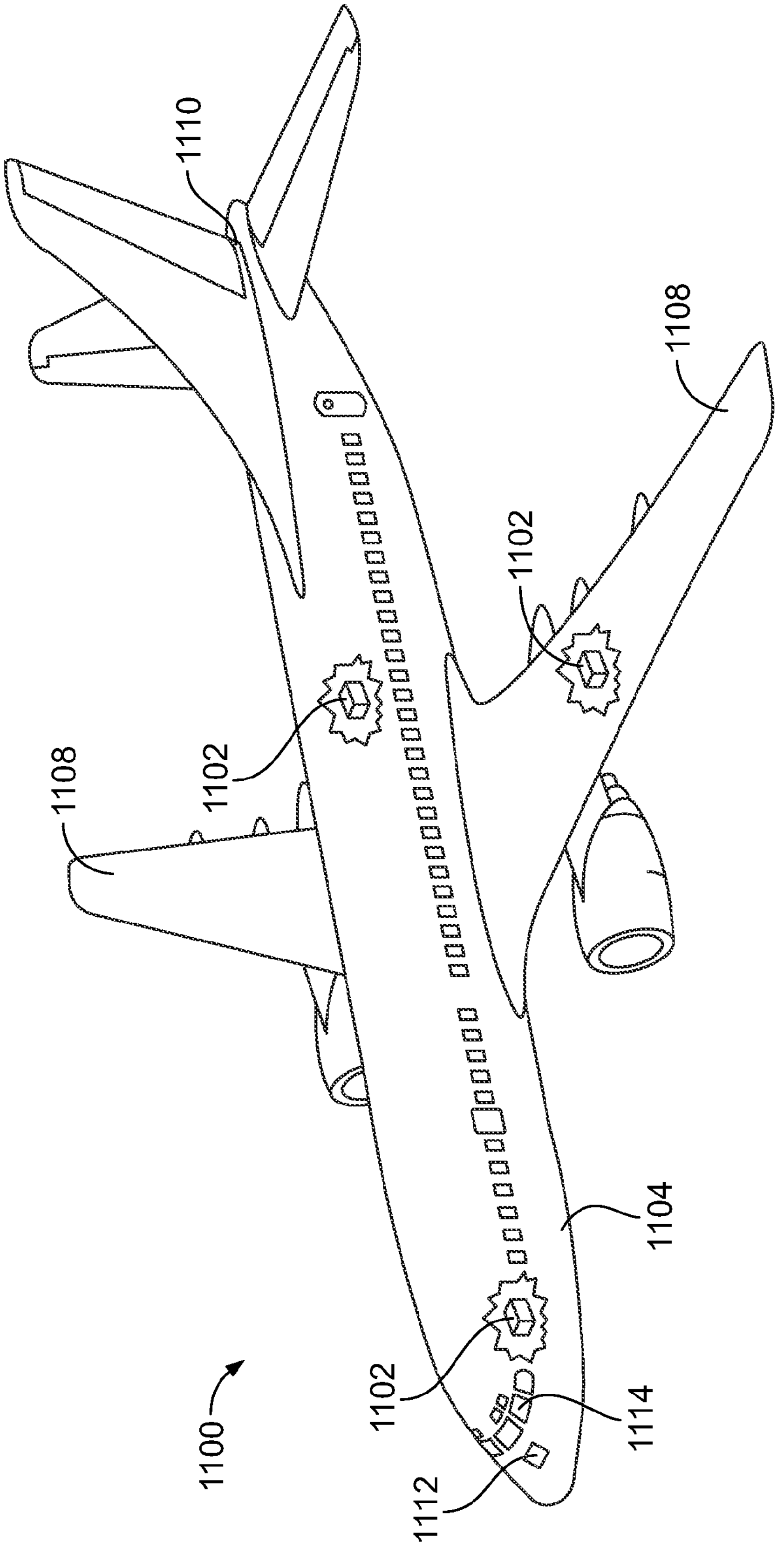
FIG. 11 illustrates a perspective view of an aircraft, according to an embodiment of the present disclosure.

FIG. 11 illustrates a perspective view of an aircraft 1100, according to an embodiment of the present disclosure. The aircraft 1100 is an example of a vehicle that includes a plurality of operative sub-systems 1102. The aircraft 1100 includes a fuselage 1104. Operative sub-systems 1102 may be positioned throughout the fuselage 1104. Operative sub-systems 1102 may also be positioned at various areas of the aircraft 1100, including wings 1108, tail 1110, and the like. A monitoring system 1112 may be positioned within the aircraft, such that it may be accessible by a pilot within a cabin 1114. The monitoring system 1112 may be in communication with one or more sensors of each operative-sub-system 1102 throughout the aircraft 1100. Alternatively, the monitoring system 1112 may be remotely located from the aircraft 1100.

As described above, embodiments of the present disclosure provide systems and methods for efficiently analyzing data from operative sub-systems to determine the existence of impending faults. Embodiments of the present disclosure provide systems and methods that efficiently preprocess data, such as sensor signals received from operative sub-systems of an aircraft, which may be analyzed for fault predictions.

Embodiments of the present disclosure provide systems and methods that significantly decrease the processing time and energy of a computing device. Embodiments of the present disclosure provide systems and methods that allow large amounts of data to be quickly and efficiently analyzed by a computing device. For example, an aircraft may include numerous operative sub-systems, each of which outputs a large amount of data, in the form of sensor signals. The vast amounts of data are efficiently organized and/or analyzed by a monitoring system, as described above. The monitoring system analyzes the data in a relatively short time so that the data may then be further analyzed by a fault detection system. For example, the monitoring system may analyze and report preprocessed data between flights of an aircraft (such as within a single day). A human being would be incapable of analyzing such vast amounts of data in such a short time. As such, embodiments of the present disclosure provide increased and efficient functionality with respect to prior computing systems, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

It has been found that embodiments of the present disclosure provide systems and methods that efficiently preprocess/process data, use less memory, and reduce network consumption, as compared to prior systems and methods. For example, embodiments of the present disclosure were used in relation to an environmental control system (ECS) of an aircraft. A data set of 80 GB that contained various ECS variables was collected by one aircraft during 73 flights, during which some ECS failures occurred. In particular, the data included 100 variables, with variable time series of approximately 500,000 values. It took more than 36 hours for a standard computer using previously-known monitoring techniques to analyze all of the data. In stark contrast, embodiments of the present disclosure utilizing the systems and methods described with respect to FIGS. 1-11 analyzed all of the data in less than 3.5 hours.

As used herein, the term "computer," "control unit," "module," or the like may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "control unit," or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The diagrams of embodiments herein may illustrate one or more control units or modules. It is to be understood that the control units or modules represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more of a field programmable gate array (FPGA), application specific integrated circuit (ASIC), microprocessor(s), a quantum computing device, and/or the like. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation) to perform the task or operation. For the purposes of clarity and the avoidance of doubt, a general purpose computer is not "configured to" perform a task or operation unless or until specifically programmed or structurally modified to perform the task or operation.

The above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

What is claimed is:

1. A vehicle comprising:

at least one operative sub-system on or within the vehicle, wherein the at least one operative sub-system includes at least one sensor configured to output one or more sensor signals related to the at least one operative sub-system; and a monitoring system in communication with the at least one operative sub-system, wherein the monitoring system is configured to: (a) correlate the one or more sensor signals with respect to time, (b) compile initial statistics of the one or more sensor signals with respect to a plurality of variables of the at least one operative sub-system; and (c) correlate the plurality of variables of the at least one operative sub-system.

2. The vehicle of claim 1, wherein the monitoring system comprises:

a data correlation unit that is configured to correlate the one or more sensor signals with respect to time;

an initial statistics compilation unit that is configured to compile the initial statistics; and a variable correlation unit that is configured to correlate the plurality of variables.

3. The vehicle of claim 2, wherein the monitoring system further comprises a data filtering unit that is configured to filter one or both of irrelevant or out-of-range data from the one or more sensor signals.

4. The vehicle of claim 2, wherein the data correlation unit is configured to output a data table that correlates the one or more sensor signals with respect to time.

5. The vehicle of claim 2, wherein the initial statistics compilation unit is configured to output an initial statistics report that compiles the initial statistics of the one or more sensor signals with respect to the plurality of variables.

6. The vehicle of claim 5, wherein the initial statistics report includes at least the following statistics of the one or more sensor signals with respect to the plurality of variables: a minimum value, a maximum value, a mean value, and a median value.

7. The vehicle of claim 2, wherein the variable correlation unit is configured to calculate maximal information coefficients (MICs) with respect to the plurality of variables, wherein the MICs represents a measure of a strength of an association between the plurality of variables of the at least one operative sub-system, and wherein the plurality of variables are separate and distinct from one another.

8. The vehicle of claim 2, wherein the variable correlation unit is configured to output tasks and compute MIC calculations for each of the tasks.

9. The vehicle of claim 8, wherein the variable correlation unit is configured generate separate and distinct tasks, wherein each of the task includes a two variable time series.

10. The vehicle of claim 8, wherein the variable correlation unit is configured to compute the MIC calculations using only one or more mappers without reducers.

11. The vehicle of claim 8, wherein the variable correlation unit includes a plurality of nodes, and wherein the variable correlation unit is configured to fairly distribute the tasks among the plurality of nodes.

12. The method of claim 8, wherein the computing MIC calculation operation comprises fairly distributing the tasks among the plurality of nodes.

13. A method of monitoring one or more operative sub-systems of a vehicle, the method comprising:

receiving one or more sensor signals from the one or more operative sub-systems of the vehicle;

correlating the one or more sensor signals with respect to time;

outputting a data table that correlates the one or more sensor signals with respect to time;

filtering one or both of irrelevant or out-of-range data from the one or more sensor signals;

compiling initial statistics of the one or more sensor signals with respect to a plurality of variables;

outputting an initial statistics report that compiles the initial statistics of the one or more sensor signals with respect to the plurality of variables; and correlating the plurality of variables.

14. The method of claim 13, wherein the correlating the plurality of variables operation comprises calculating maximal information coefficients (MICs) with respect to the plurality of variables.

15. The method of claim 14, wherein the calculating MIC with respect to the plurality of variables operation comprises:

outputting tasks; and computing MIC calculations for each of the tasks.

16. The method of claim 15, wherein the computing MIC calculations operation comprises using only one or more mappers without reducers.

17. A monitoring system in communication with at least one operative sub-system, wherein the monitoring system comprises:

a communication link that is configured to receive one or more sensor signals from the at least one operative sub-system;

a data correlation unit that is configured to correlate the one or more sensor signals with respect to time;

an initial statistics compilation unit that is configured to compile initial statistics of the one or more sensor signals with respect to a plurality of separate and distinct variables of the at least one operative sub-system; and a variable correlation unit that is configured to correlate the plurality of separate and distinct variables of the at least one operative sub-system.

18. The monitoring system of claim 17, wherein the monitoring system is onboard a vehicle.

19. The monitoring system of claim 17, wherein the data correlation unit is configured to output a data table that correlates the one or more sensor signals with respect to time, and wherein the initial statistics compilation unit is configured to output an initial statistics report that compiles the initial statistics of the one or more sensor signals.

20. The monitoring system of claim 17, wherein the variable correlation unit includes a plurality of nodes and is configured to calculate maximal information coefficients (MICs) with respect to the plurality of separate and distinct variables of the at least one operative sub-system, wherein the variable correlation unit is configured to output tasks and compute MIC calculations for each of the tasks, wherein the variable correlation unit is configured to compute the MIC calculations using only one or more mappers without reducers, and wherein the variable correlation unit is configured to fairly distribute the tasks among the plurality of nodes.

* * * * *